United States Patent [19]

Oldershaw et al.

[11] Patent Number: 4,935,827
[45] Date of Patent: Jun. 19, 1990

[54] DYNAMIC HEAD POSITION TRACKING CONTROL FOR A MAGNETIC TAPE PLAYBACK SYSTEM

[75] Inventors: Reginald W. Oldershaw, Redwood City; John Hutson, Palo Alto, both of Calif.

[73] Assignee: Ampex Corporation, Redwood City, Calif.

[21] Appl. No.: 269,279

[22] Filed: Nov. 9, 1988

[51] Int. Cl.⁵ .............................................. G11B 5/588
[52] U.S. Cl. .............................. 360/77.16; 360/77.17; 360/10.2
[58] Field of Search ............... 360/77.16, 77.17, 77.14, 360/77.15, 10.2, 10.3, 75, 70, 64, 38.1

[56] References Cited

U.S. PATENT DOCUMENTS

| | | | |
|---|---|---|---|
| 4,402,022 | 8/1983 | Hirota et al. | 360/77.17 |
| 4,420,778 | 12/1983 | Sakamoto | 360/77.17 |
| 4,443,823 | 4/1984 | Sakamoto | 360/77.16 |
| 4,550,351 | 10/1985 | Hamalainen | 360/77.17 |
| 4,720,753 | 1/1988 | Iwasaki et al. | 360/77.15 |
| 4,739,420 | 4/1988 | Odaka et al. | 360/77.14 |

Primary Examiner—Alan Faber
Assistant Examiner—David L. Robertson
Attorney, Agent, or Firm—James A. LaBarre; George B. Almeida; Richard P. Lange

[57] ABSTRACT

A dynamic head position tracking control for a magnetic tape playback system employs a detected dither signal to determine the elevational position of a pair of magnetic transducing heads relative to tracks of recorded information being scanned by the heads. This detection is carried out at several locations along the lengths of the tracks being scanned, and a value is stored for each of the locations. Based upon the stored information, an estimation is made of a position value for the first location along the length of the tracks. This estimation is determined from a weighted extrapolation of the following two samples taken during the scan of the track. The elevational position of the heads is then dynamically controlled in accordance with the actual and estimated head position values.

22 Claims, 4 Drawing Sheets

DYNAMIC HEAD POSITION TRACKING CONTROL FOR A MAGNETIC TAPE PLAYBACK SYSTEM

BACKGROUND OF THE INVENTION

The present invention is generally directed to the recording and reproduction of signals on a magnetic medium, particularly the positioning of a record/reproduce transducer head adjacent to a track of information on a magnetic recording tape. More specifically, the invention is directed to a system for dynamically positioning plural transducing heads adjacent to tracks of video signal information in accordance with a predicted shape for the tracks.

Information signals, for example video signals, are typically recorded on a magnetic medium, such as magnetic tape, in discrete tracks of information. In one type of recording system that is in widespread use for recording video signals, the magnetic tape is disposed around the periphery of a scanning drum and longitudinally transported relative thereto. One or more magnetic transducing heads rotate about the circumference of the drum. The tape follows a helical path around the drum, so that the rotating head transcribes a path, or track, along the tape that is disposed at an angle relative to the longitudinal direction of the tape. As the tape is transported around the drum at a predetermined speed, successive adjacent tracks are formed on the tape at that angle. During playback, if the tape is transported around the scanning drum at the same speed, the rotating transducing head will successively read the tracks in the order in which they were recorded, under ideal conditions.

However, due to varied conditions such as stretching of the tape, differences in the normal speed between one machine and another, etc., the transducing head may not be precisely positioned over a recorded track. As the location of the head moves away from the center of the track, the quality of the reproduced signal begins to degrade.

Accordingly, in order to faithfully reproduce individual tracks of video information, it is necessary to deflect the transducing head in a direction that is substantially transverse to its path of movement around the scanning drum. In other words, the transducing head must be moved in a direction that is parallel to the axis of the drum to enable it to remain adjacent to a particular track of recorded information. The position of the head in this direction is sometimes referred to as its "elevation."

Various techniques have been developed to control the elevation of the head to maintain it substantially centered over the recorded track. One popular technique applies a continuously oscillating dither signal to a control voltage that determines head elevation, to provide feedback information that enables the transducing head to be precisely positioned Exemplary servo systems which utilize a dither signal for controlling the elevation of the transducing head are disclosed in U.S. Pat. Nos. 4,151,570, 4,163,993 and 4,485,414, among others.

Under proper tracking conditions, i.e., when the transducing head is precisely centered over the track of recorded information that is being reproduced, an RF information signal from the head, for example a video signal, is at a maximum amplitude. When the head is displaced to one side or the other of the track, the amplitude of the RF signal decreases. When the dither signal is imposed upon the head elevation position control signal, it causes the head to slightly oscillate to either side of the recorded track of information, resulting in a sinusoidal envelope in the RF waveform from the transducing head. If the average position of the head is centered over the track of information being reproduced, this RF envelope has a symmetrical shape. If, however, the average position of the head is displaced from the track, the envelope will be asymmetrical with respect to the dither signal. More particularly, the magnitude of the reproduced RF signal will be lower when the dither oscillations are at one extreme than when they are at the other extreme. This asymmetry in the envelope can be detected and used to correct the position of the head.

Transducing head elevation servo systems which employ a dither signal or similar type of signal for providing feedback information relating to the alignment between the head and a track of recorded information utilize two different types of information from the dither signal to control the elevational position of the heads. In one portion of the control loop of the servo system, real-time information that is obtained from a detected dither signal is used to effect instantaneous position control of the head. In another portion of the control loop of the servo system, the feedback information obtained from the detected dither signal is averaged over several successive scans of the recorded tracks. This information provides an indication of the average shape and relative position of a track, and can be used to effect dynamic or high rate error correction of the head position. The present invention is particularly concerned with this latter aspect of head elevation servo systems, i.e., the dynamic or high rate error correction based upon a predicted shape of the recorded track. Therefore, the description which appears hereinafter will be primarily focused upon this aspect of the head elevation servo system.

In the dynamic correction of the head position to account for the shape of the track, the magnitude of the dither correction signal is sampled at several locations along the length of each track being scanned. For example, 10-15 samples might be made along the length of each track. Each sample provides an indication of the elevational position of the head, relative to the track, at the location of that sample. By averaging the samples for the respective locations over several successive scans of the tracks, information regarding the average shape of the track is obtained. Thus, for example, if each track is generally "S" shaped, the head will be displaced to one side of the track during an early part of its scan of that track and displaced to the other side of the track during the latter part of the scan, since the head generally tends to follow a linear path. However, by sampling and storing the detected dither signal which indicates the displacement of the head, and subsequently applying these stored values to the head positioning control signal during subsequent scans, the head can be dynamically positioned in accordance with the predicted shape of the track.

Typically, the dynamic correction of the head position is carried out by sequentially connecting storage capacitors to the detected dither signal during successive, respective portions of the track being scanned. The connections of the capacitors to the dither correction signal can be controlled on a time basis, in a manner analogous to the operation of a demultiplexer. Thus, if N storage capacitors are provided, each capacitor could be connected to the dither correction signal for 1/N of the total time required to scan a single track of recorded information, resulting in N samples. These samples are then successively applied to the head position control signal during subsequent scans of recorded tracks.

In some types of magnetic tape recorders, two or more heads are in contact with the tape at any one time to record or reproduce plural tracks of information simultaneously. For example, in a video tape recording machine a field of video information can be divided over several successive tracks. In this plural head type of arrangement, the two transducing heads are mounted on a common deflectable arm and moved in unison during elevational positioning. The heads can be mounted close enough to one another to scan two physically adjacent tracks on the tape. To diminish the likelihood of cross-talk between the two adjacent tracks, the two heads can be offset at slight angles in opposite respective directions to the axis of the tape. This offsetting of the heads in opposite directions is typically referred to as "cross-azimuth". Since the two heads are mounted on a common movable arm for elevational positioning, the dither signal that is imposed upon the elevation control signal influences both heads. It is possible to employ the dither feedback signal from only one of the heads to effect elevational position correction. Since the two heads are always moved in unison, any asymmetry in the RF envelope from one head should be indicative of track misalignment of the other head as well.

In order to accommodate differences in the distance between heads from one machine to another, it would be more preferable to average the dither envelope in the RF signals from both of the heads, and use this averaged signal to control elevational position. When this averaging technique is employed, however, a problem arises in connection with the sampling of the detected dither signal for dynamic correction purposes if more than one pair of heads is used to reproduce the recorded tracks of information. For example, if two pairs of heads are employed each pair is alternately in and out of contact with the tape during recording and reproduction. Furthermore, the two heads in a pair which are in simultaneous contact with the tape are spaced in the direction of their movement around the drum. As a result, one head comes into contact with the tape slightly before the other head in the pair, and the signal from the trailing head in the direction of the scan is slightly delayed relative to the leading head. Because of this slight delay between the signals from the two heads in one pair and the alternating arrangement of head pairs, it is possible that the leading head in one pair will come into contact with the tape and begin to reproduce a track of recorded information before the trailing head of the other pair has come out of contact with the tape. If the dither signals from these two heads in different pairs are averaged together, the result does not provide any meaningful information because it pertains to two different portions of two different tracks. Consequently, the first sample of the detected dither signal must be disregarded.

It is possible to disregard the first sample by simply clamping it to a ground reference potential. However, if the following samples of the detected dither signal have a significant non-zero value, it can be appreciated that there will be a sharp transition between the value of the first, grounded sample and the following samples. This sharp transition can result in a spike in the head position correction signal, which could take some period of time to settle out of the control loop.

Accordingly, it is desirable to be able to reliably predict the value of a missing sample of the track curve measuring system. Since the missing sample represents the first sample in a sequence, it is most preferable to predict the value of this missing sample on the basis of the next few samples which can be reliably measured.

BRIEF STATEMENT OF THE INVENTION

In accordance with the present invention, the elevational position of a magnetic transducing head is detected relative to a track of recorded information being scanned by the head. This detection is carried out at several locations along the length of the track, and a value is stored for each of these locations. Based upon the stored information, an estimation is made of a position value for the first and/or last location along the length of the track. This estimation is determined from a weighted extrapolation of a few samples adjacent the location whose value is being estimated. Preferably, the estimated first sample is equal to the algebraic sum of the adjacent second sample and the difference between the second and third samples, or a percentage of this difference. If desired, the value for the last sample can also be estimated in a similar manner using the two previously measured samples.

The elevational position of the head is dynamically controlled in accordance with the actual and estimated head position values. The weighting can be such that each value which is used to determine an estimated value is given equal consideration. More preferably, however, the actual value which is closest in position to the estimated value, e.g., the value for the second sampled location, is given a greater weight than subsequent measured values. By giving the closest value a greater weight than subsequent values, the estimated value is less likely to be erroneously influenced by sharp curves in the shape of the recorded tracks.

Further features of the invention, as well as the advantages offered thereby, are explained in greater detail hereinafter with specific reference to preferred embodiments illustrated in the accompanying drawings.

DESCRIPTION OF THE ILLUSTRATED EMBODIMENTS

In the following description of a preferred embodiment of the invention, reference is made to the recording and reproduction of video signals using dual heads and a helical scan format to record/reproduce tracks of video information as well as a dither signal to detect the position of the heads. Although the principles which underlie the present invention are particularly suited for use in this type of recording and reproduction system, it will be appreciated by those familiar with the relevant technology that the applicability of the invention is not limited thereto. Rather, this particular example is chosen to facilitate an understanding of the invention and an appreciation of the advantages offered thereby.

Figure 1:
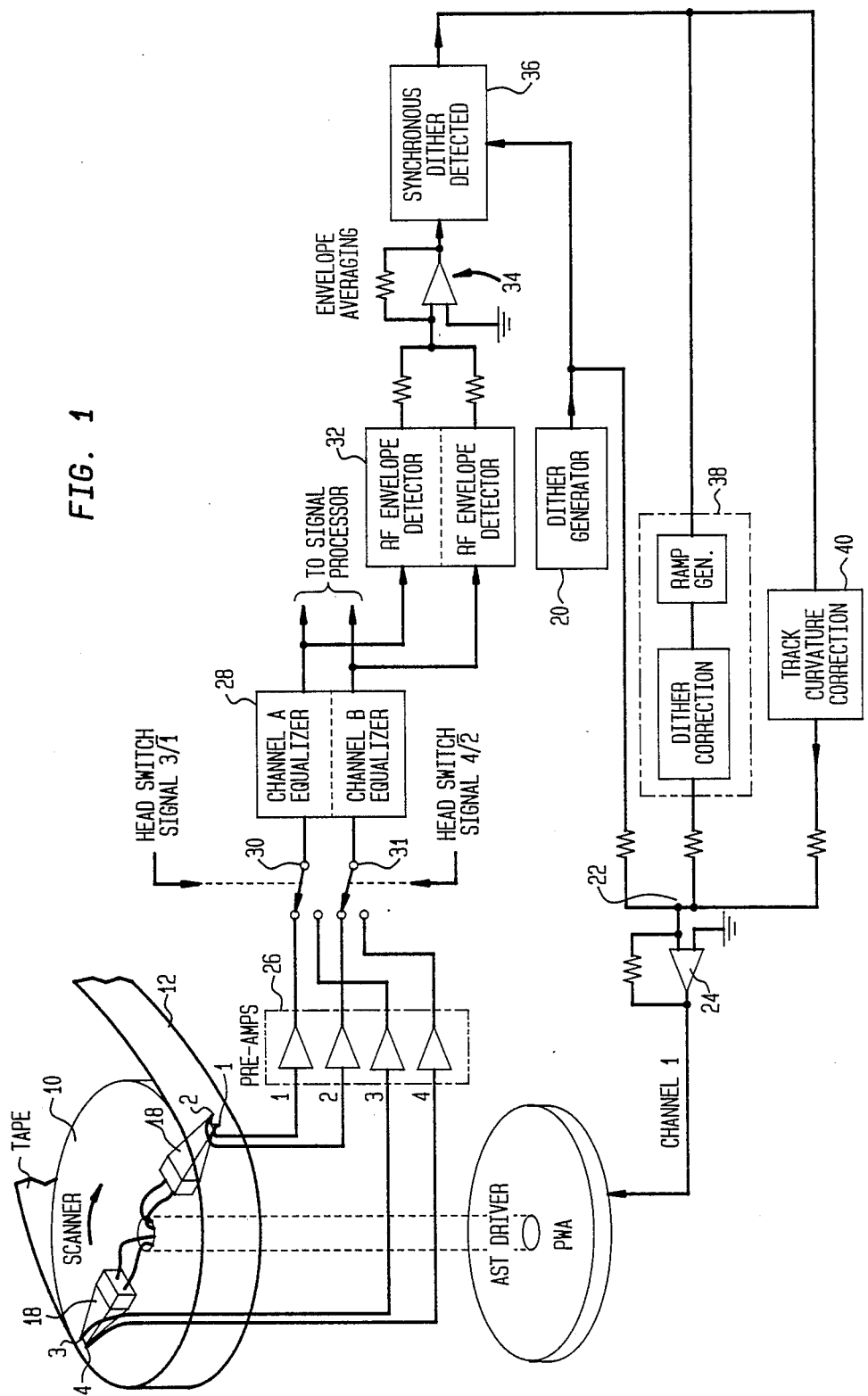
FIG. 1 is a partial schematic and partial block diagram view of a portion of a magnetic tape reproduction system of the type to which the present invention is applicable.
Figure 2:
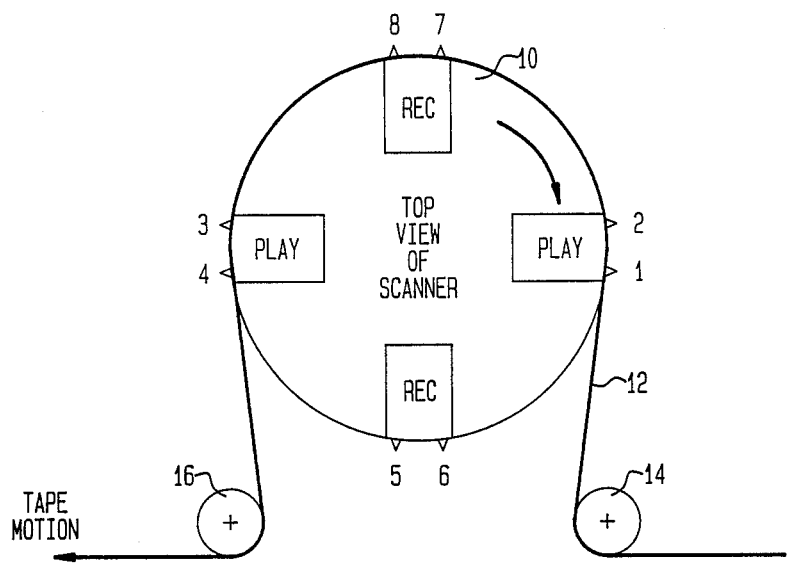
FIG. 2 is a schematic plan view of the arrangement of a magnetic recording tape on a scanning drum.

An exemplary magnetic tape recording and reproducing system of the type to which the present invention is applicable is schematically illustrated in FIGS. 1 and 2. FIG. 1 contains a perspective illustration of the head scanning mechanism along with a block diagram of the head elevation control system, and FIG. 2 is a top view of the head scanning system. Referring to the figures, the recording and reproducing system includes a scanning drum 10 about which a magnetic recording tape 12 is partially wrapped. Typically, the drum 10 is comprised of an upper drum and a lower drum. The lower drum remains stationary while the upper drum is rotated. In the embodiment illustrated in FIGS. 1 and 2, the rotation of the drum is in a clockwise direction. As best shown in FIG. 2, the tape 12 is guided around a pair of guide rollers 14, 16 and the drum 10 so that it is in contact with approximately 180° of the surface of the drum. The tape is longitudinally moved by a suitable transport mechanism, for example a capstan (not shown), so that it traverses the surface of the drum. In the embodiment illustrated in the figures, the direction of tape movement across the surface of the drum is counterclockwise, i.e., opposite to the direction of drum movement.

Two pairs of magnetic playback transducing heads, labelled 1, 2, 3, 4, are disposed at the circumferential surface of the upper rotating drum. One pair of heads 1, 2 is disposed 180° from the other pair 3, 4. Typically, one pair of heads is in contact with the portion of the tape 12 disposed around the periphery of the drum 10, while the other pair is out of contact with the tape. As the drum rotates, the pairs alternately come in contact with the tape. One head in each pair, e.g., heads 1 and 3, are associated with one channel of information, Channel A, and the other head in each pair, i.e., heads 2 and 4, are associated with Channel B information.

As illustrated in FIG. 2, the drum can also include two pairs of recording heads 5, 6, 7, 8. In a manner similar to the playback heads, the two pairs of recording heads are disposed on diagonally opposite sides of the drum, and displaced 90° around the circumferential surface of the drum from the playback heads. The tape 12 is disposed along a path that forms a helix around the surface of the drum 10. Thus, as the upper drum rotates, the individual heads transcribe tracks which are oriented at an acute angle relative to the longitudinal direction of the tape.

Assuming the axis of the drum 10 is vertically oriented, all of the heads normally travel about a horizontal path. To improve packing density on the tape, one head in each pair, e.g., 1, 3, 5, 7 is oriented at an angle of about 15° relative to the horizontal plane. The other head, 2, 4, 6, 8 in each pair is oriented at the same angle but in the opposite direction, to provide a cross azimuth relationship. With this arrangement, the tracks transcribed by the respective heads in each pair can be located directly adjacent one another, without interference between them during playback.

Each of the two heads in a pair is mounted on a common deflectable arm 18. The ends of these arms on which the heads are mounted can be moved in a direction that is transverse to the path transcribed by the rotating heads, i.e., they can be deflected in a generally vertical direction. Preferably, the vertical movement of the arms to determine the elevational positions of the heads is effected by means of a voice coil (not shown) upon which each arm is mounted. The positioning of the arm is controlled in response to a voltage signal applied to the voice coil.

The circuit for generating this control voltage signal is illustrated in block diagram form in FIG. 1. To enable the elevational position of the heads relative to a scanned track to be determined, a low frequency oscillating signal, for example a 1 KHz sinusoidal signal, is produced by a dither generator 20 and applied to a summing junction 22. At the summing junction 22 the dither signal is combined with other head position correction signals (described in greater detail hereinafter) and fed as an input signal to an amplifier 24. The output signal from the amplifier comprises the control voltage that is applied to the voice coils for the deflectable arms on which the heads are mounted.

As explained in detail in the previously mentioned patents, the dither signal causes a sinusoidal amplitude envelope to be imposed upon the RF output signal from the playback heads 1-4. The RF output signals are fed to associated preamplifiers 26 and then selectively connected to a pair of equalizers 28 for the respective channels. The selective connection of the amplified RF signals to the equalizers is carried out by means of a pair of switches 30, 31 whose positions are controlled by respective head switch signals in accordance with the rotational position of the scanning drum 10. During one half of a revolution of the drum, the switches are in the positions illustrated in FIG. 1, to connect the equalizers to the two heads which are in operative contact with the tape. When these two heads come out of contact with the tape and the other two heads come into contact with the tape, the positions of the respective switches 30, 31 are changed, so that the equalizers are always connected to the two heads which are in operative relationship with the tape at any time. The output signals from the equalizers are applied to suitable signal processing circuitry which decodes the signals to determine the information stored on the tape.

The output signals from the equalizers are also applied to a pair of RF envelope detectors 32. These detectors filter out the high frequency RF information signal and produce output signals indicative of the shape of the RF envelope which is imposed on the output signals from the heads as a result of the applied dither signal. The two envelope signals from the respective RF envelope detectors 32 are averaged together in a suitable averaging circuit 4, and the resulting signal is applied as one input to a synchronous detector 36. The synchronous detector correlates the averaged envelope signal with the dither signal from the generator 20, and produces a detected dither signal.

The detected dither signal from the synchronous detector 36 provides an indication of the elevational position of the heads relative to the track being scanned. This signal is applied to a ramp generator and dither correction circuit 38, which generates a position compensation signal to correct any misalignment between the heads and the tracks being scanned. Basically, the ramp generator and dither correction circuit 38 provides instantaneous correction of the elevational position of the heads in response to the detected dither signal. Although not illustrated in FIG. 1, the ramp generation and dither correction circuit receives other input signals in addition to the detected dither signal that are indicative of the particular mode of operation of the recording and reproduction system. For example, these other input signals indicate whether the system is in a normal playback mode or a special effects mode, such as fast play or freeze frame. In response to these signals, the ramp generation and dither correction circuit 38 generates suitable control voltages to position the head in accordance with the anticipated location of the track for the mode of operation.

In addition, the detected dither signal is applied to a track curvature correction circuit 40. The track curvature correction circuit essentially averages the detected dither signal over several successive scans of recorded tracks to determine the general shape and position of the tracks. For example, if the tape is stretched during playback the tracks could have a curved shape rather than being perfectly linear. Also, if the speed of the tape differs slightly during reproduction than the speed at which it was recorded, or the rotational speed of the scanner on a playback machine is different from the rotational speed of the scanner for the machine on which the tape was recorded, the angle of the tracks might be slightly offset. The track curvature correction circuit 40 determines the average shape and orientation of the tracks on the basis of the detected dither signal, and produces an output signal to control the elevational position of the heads in accordance with the predicted shape and orientation of the track being scanned. The output signals from the dither correction circuit 38 and the track curvature correction circuit 40 are summed with the dither signal at the junction 22, and applied to the amplifier 24 to properly position the transducing heads during playback.

Figure 3:
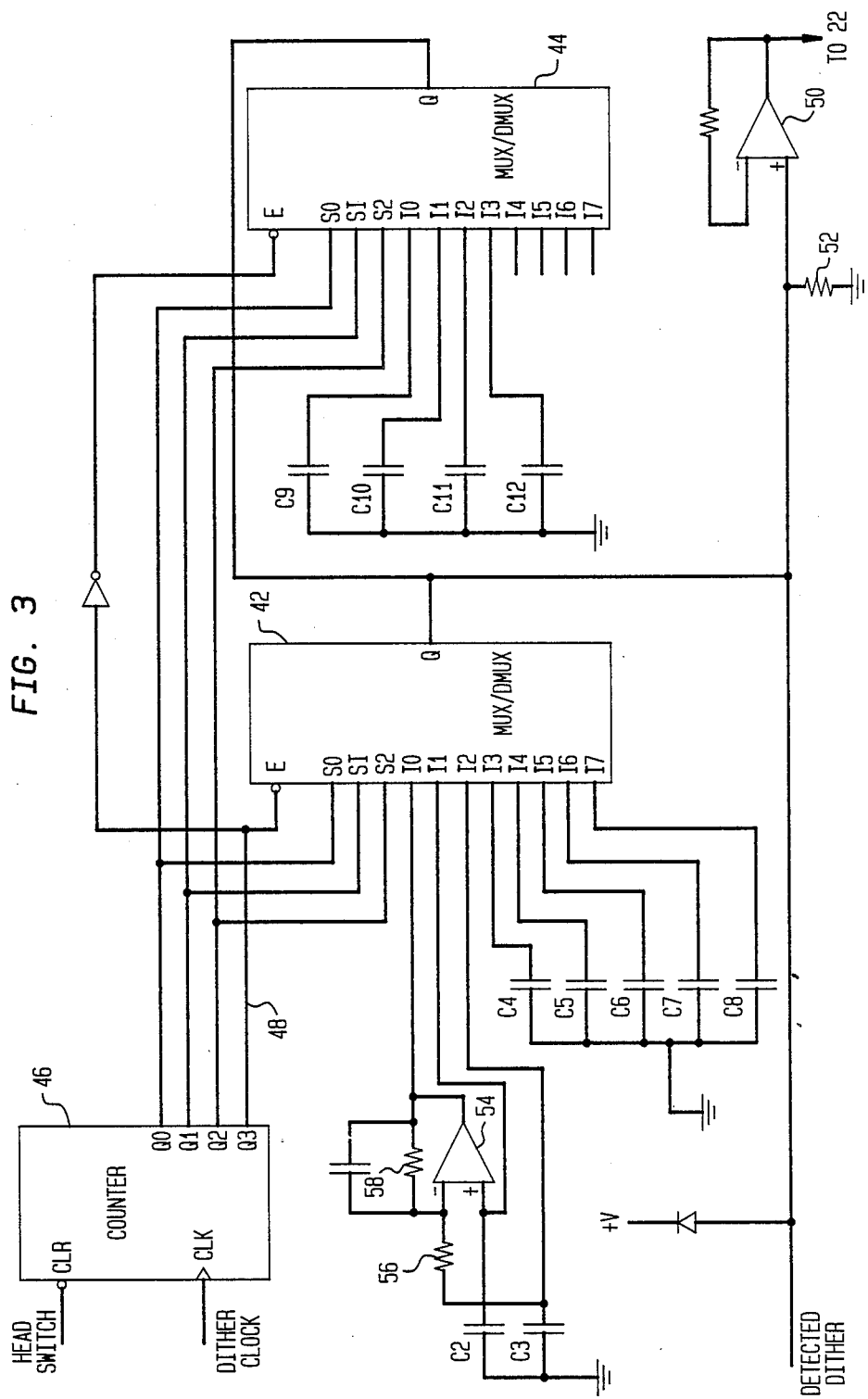
FIG. 3 is partial block and partial schematic diagram of a track curvature filter which includes the estimation feature of the present invention.

An example of a track curvature correction circuit is illustrated in greater detail in FIG. 3. The detected dither signal from the synchronous detector 36 is applied to the common terminals of a pair of multiplexers/demultiplexers 42, 44. These multiplexers/demultiplexers are responsive to a 4-bit address signal from a counter 46 to connect the detected dither signal at a common input/output terminal Q to one of a plurality of selectable terminals $I_n$. In the embodiment illustrated in FIG. 3, twelve samples of the detected dither signal are taken during each scan of a track. In the implementation shown in FIG. 3, one of the multiplexers/demultiplexers 42 has eight selectable terminals which are employed, and the other multiplexer/demultiplexer 44 also has eight selectable terminals, but only four are used. Seven of the eight selectable terminals $I_1$-$I_7$ of the first multiplexer/demultiplexer 42 are respectively connected to storage capacitors C2-C8. Similarly, the four selectable terminals $I_0$-$I_3$ of the multiplexer/demultiplexer 44 that are utilized are connected to storage capacitors C9-C12.

The counter 46 functions to count an input clock signal having the same frequency as the dither signal. In fact, the clock signal can be a square wave version of the dither signal. In operation, the counter 46 is reset at the beginning of each scan of a recorded track on the tape. The signal which is used to reset the counter can be the same signal that controls the switch 30 to indicate when the respective pairs of heads go into and out of contact with the tape. Each transition in the head switch signal causes the counter 46 to be reset. After being reset, the counter 46 counts the pulses in the dither clock signal to produce the 4-bit address signal that is applied to the multiplexers/demultiplexers 42 and 44. The most significant bit on an output line 48 determines which of the two multiplexers/demultiplexers 42 or 44 is to be operative at any time, and the other three bits indicate which one of the eight selectable terminals $I_n$ in the operative multiplexer/demultiplexer is to be connected to its common terminal Q. As a result, the detected dither signal is sequentially applied to the storage capacitors C2-C12 during successive respective cycles of the dither signal. Thus, it will be appreciated that the number of samples that are taken per track will be a function of the frequency of the dither signal and the length of the recorded track.

In addition to being successively applied to the storage capacitors during respective segments of the track being scanned, the detected dither signal is also applied to the non-inverting input terminal of a differential amplifier 50. In operation, when the common terminal Q of one of the multiplexers/demultiplexers 42 or 44 is connected to one of its selectable terminals, the storage capacitor connected to that terminal discharges through a resistor 52 connected between the non-inverting input terminal of the amplifier 50 and ground. Thus, the detected dither signal is averaged with the voltage stored in the capacitor under consideration, to provide a dynamic correction signal based upon previously detected positions of the head relative to the track for the particular portion under consideration. This dynamic correction signal appears at the output terminal of the amplifier 50 and is applied to the summing junction 22.

Figure 4:
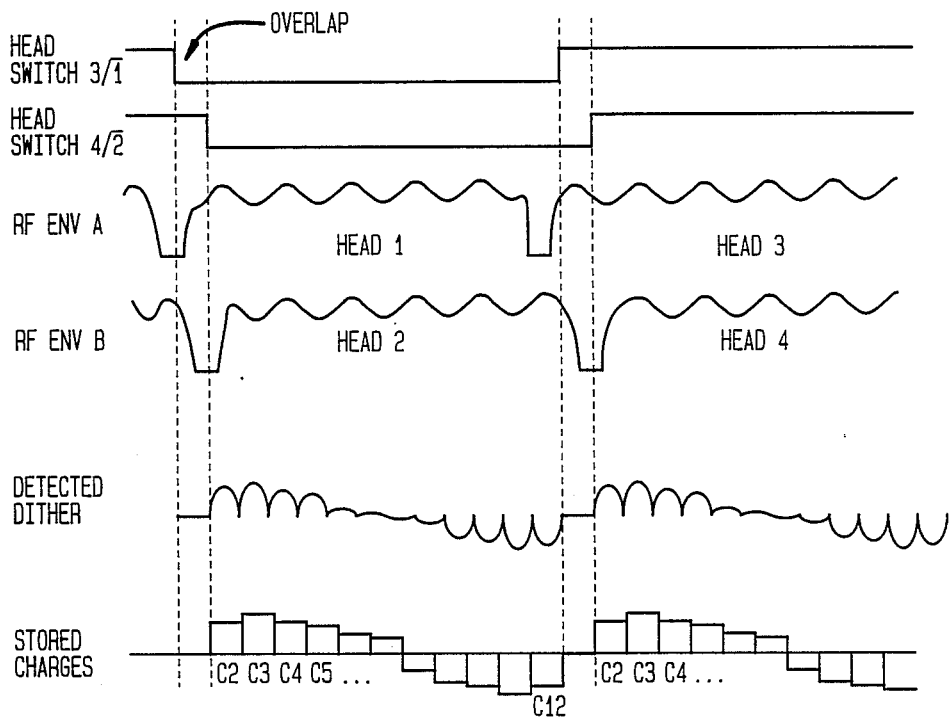
FIG. 4 is a timing diagram of the signals generated during the operation of the system depicted in FIGS. 1 and 3.

FIG. 4 illustrates a timing diagram for signals which are produced during the operation of the circuits shown in FIGS. 1 and 3. A pair of head switch signals provide an indication of the particular heads which are in operative contact with the tape at any time. One signal provides an indication as to which of the two leading heads in each of the pairs, i.e., head 1 or head 3, is in contact with the tape, and another signal indicates which of the two trailing heads, 2 or 4, is in contact with the tape. The two heads in each pair are displaced from one another in the direction of the scan, i.e., in the horizontal direction. As a result, the leading head in each pair will come into contact with the tape a short period of time prior to the trailing head of the pair. For example, the length of this time period might be in the neighborhood of 180 microseconds. During this time, the two head switch signals will indicate that the leading head of one pair and the trailing head of the other pair are in contact with the tape. This period of time is referred to as the head switch overlap, and is identified in FIG. 4.

The RF envelope signals which are obtained from the heads in operative contact with the tape are respectively illustrated in FIG. 4 immediately below the head switch signals. These two RF envelope signals are averaged together and a detected dither signal is obtained from the synchronous detector 36, as shown. During each cycle, the amplitude of the detected dither signal is stored in a respective one of the storage capacitors C2–C12.

Due to the averaging of the two detected envelope signals from the respective heads in contact with the tape, the sample of the detected dither signal which is obtained during the period of the head switch overlap does not provide any useful information. More particularly, during the period of the overlap the detected dither signal is an average of the output signals from two heads in two different pairs. The signal from the leading head, for example head 1, relates to the beginning of a scan of a new track. However, the signal from the trailing head at this time, for example head 4, pertains to the end of the previously scanned track. Since these two signals are averaged together, the result does not provide useful information with respect to either of the two tracks. As a result, the sample which is obtained during the period of the head switch overlap must be disregarded. For this reason, the first selectable terminal of the multiplexer/demultiplexer 42 is not connected to a storage capacitor.

It is possible to disregard the first sample of the detected dither signal by simply shunting it to ground or some other reference voltage. However, this approach can produce undesirable results if the next few samples are not close to the reference voltage. For example, as shown in the example of FIG. 4, a sharp transition can exist for the grounded voltage representative of the first sample and the stored value for the second sample. Since the stored samples are A.C. coupled to the elevation error of the head, a zero voltage value for the first sample can result in a large step function from the average value of the track curvature error. In other words, a sharp spike would be produced in the tracking error correction signal that is applied to the voice coil for the deflectable arms 18, from which the arms would not be able to immediately recover.

Accordingly, it is desirable to provide an estimated value for the first sample which is based upon the adjacently measured values of the track curvature error. In accordance with the present invention, such an estimated value is generated by means of a weighted extrapolation of the second and third values.

Referring to FIG. 3, the storage capacitors C2 and C3 store the sampled track error values for the second and third sampled segments of the track, as represented in FIG. 4. These two capacitors are respectively connected to the second and third selectable terminals $I_1$ and $I_2$ of the multiplexer/demultiplexer 42. In addition, the capacitor C2 is directly connected to the non-inverting input terminal of a differential amplifier 54. The storage capacitor C3 is connected to the inverting input terminal of the amplifier through a series resistor 56. A feedback resistor 58 is connected between the output terminal of the amplifier 54 and the inverting input terminal of the amplifier. This output terminal of the amplifier is also connected to the first selectable terminal $I_0$ of the multiplexer/demultiplexer 42.

In operation, the output signal $V_1$ from the amplifier 54 is expressed according to the following equation:

$$V_1 = V_{C2}(1 + R_{58}/R_{56}) - V_{C3}(R_{58}/R_{56})$$

where $V_{C2}$, $V_{C3}$ are the voltages of the capacitors C2 and C3, respectively and $R_{56}$, $R_{58}$ are the resistances of the resistors 56 and 58.

The relative weights which are given to the voltage samples stored in each of the two capacitors C2 and C3 are determined by the ratio of the resistances of the two resistors 56 and 58. By making both resistors equal in value, a unity weighting would be provided. As an illustrative example, the voltage stored in the capacitor C2 can be six volts and the voltage of the next sample in the capacitor C3 can be seven volts. In this case, the estimated value for the first sample is as follows:

$$V_1 = 6(1+1) - 7(1) = 5 \text{ volts}$$

Figure 5A:
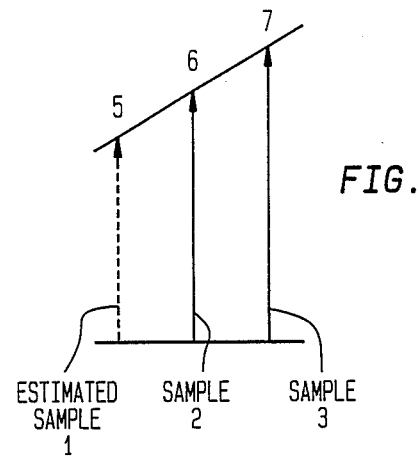
FIGS. 5A and 5B are graphic illustrations of two examples of the estimation of the first sample in accordance with the invention.

The result of this extrapolation is illustrated in FIG. 5A. Preferably, the sample which is closest to the estimated sample should be given more weight than the next succeeding sample. This approach is desirable to avoid any excessive differences between the estimated sample and the next sample that may be caused by a sharp curve in the shape of a track. Thus, for example, it may be preferable to select the resistors 56 and 58 so that the input resistor 56 has twice the value of the feedback resistor 58, to provide full weighting of the second sample and only 50% weighting of the next sample. For the example given above, the output voltage from the amplifier 54 would then become:

$$V_1 = 6(1+\tfrac{1}{2}) - 7(\tfrac{1}{2}) = 9 - 3.5 = 5.5 \text{ volts}$$

Figure 5B:
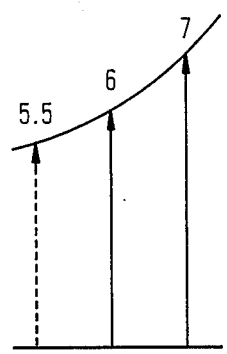

The result of this type of extrapolation is illustrated in FIG. 5B.

Figure 6A:
FIGS. 6A and 6B are illustrations of the track error correction signals that are respectively obtained without and with sample estimation.
Figure 6A:
Figure 6B:

By estimating the value of the first sample in accordance with the immediately following samples, large step functions and hence unwanted disturbances can be avoided in the control of the elevational position of the heads. This advantage is illustrated in FIGS. 6A and 6B. FIG. 6A illustrates the track curvature error signal that would be generated if the first sample were to be grounded. It can be seen that this approach can result in a large step function. This result is to be contrasted with the track curvature error signal illustrated in FIG. 6B, in which the value of the first sample is estimated in accordance with the principles of the present invention. It can be appreciated that this approach provides a much smoother error correction signal.

In the disclosed embodiment of the invention, he two samples immediately following the missing sample are used to estimate the value of that missing sample. It will be appreciated, however, that more than two samples can be used to predict the value of the first sample. For example, the input signal to the inverting input terminal of the amplifier 54 can be a suitably weighted average of the values stored in the capacitors C3 and C4 for the third and fourth samples. Similarly, the disclosed principles of the invention can be used with equal success to estimate the last sample along the length of a recorded track, on the basis of two or more previous adjacent samples.

It will therefore be appreciated by those of ordinary skill in the art that the present invention can be embodied in other forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

What is claimed is:

1. In a magnetic tape reproduction machine of the type in which information is stored on the tape in tracks and a magnetic transducing head is scanned along the length of each track to reproduce the stored information, apparatus for aligning the head with respect to the track, comprising:

head elevation positioning means for moving the head in a direction that is transverse to the direction of a scanning movement;

means for detecting the elevational position of the head relative to a track being scanned at plural locations along the length of the track, and storing a position value for at least some of said locations;

means for estimating a position value for one of said locations on the basis of the stored position values for at least two locations adjacent said one location in the direction of scan of the tracks; and means for controlling said head elevation positioning means in response to said estimated value and said stored values during the scanning of a track to thereby position said head in accordance with a predicted shape for the track being scanned.

2. The apparatus of claim 1 wherein said detecting and storing means includes means for generating a signal indicative of the elevational position of the head relative to a track of stored information, and plural sample and hold devices for sampling the value of said signal at respective times during the scan of a track and storing the sampled values.

3. The apparatus of claim 2 wherein said estimating means includes means for generating an estimation signal having a value that is an extrapolation of the stored values for at least the two locations immediately adjacent said one location.

4. The apparatus of claim 3 wherein said one location is the first sampled location along the length of a track and said two adjacent locations are the second and third locations along the length of the track.

5. The apparatus of claim 3 wherein said estimation signal generating means includes a weighting function such that the stored value for the first location immediately adjacent said one location has a greater influence on said extrapolated value than the stored value for the next location adjacent said one location.

6. The apparatus of claim 3 wherein said estimation signal generating means comprises a differential amplifier which receives signals related to the stored values of said two locations at respective input terminals thereof and produces said estimation signal as an output signal.

7. The apparatus of claim 6 further including an impedance connected to at least one of the input terminals of said differential amplifier for weighting the stored value that is applied as an input signal to said one terminal.

8. The apparatus of claim 7 wherein said impedance comprises a first resistor connected in series between a storage device for one of said two stored values and said one input terminal, and a second resistor connected in a feedback loop between an output terminal of said amplifier and said one input terminal.

9. The apparatus of claim 8 wherein said first and second resistors have equal resistance values such that the stored values for said two locations are equally weighted.

10. The apparatus of claim 8 wherein said second resistor has a lower resistance value than said first resistor, such that the stored value that is applied to said one terminal has a lower weight than the stored value applied to the other input terminal.

11. The apparatus of claim 2 wherein said sample and hold devices comprise a plurality of capacitors and a switch for selectively applying said signal to said capacitors at respective times during the scan of a track.

12. The apparatus of claim 2 wherein said sample and hold devices store an average value related to the detected elevational positions of the head at said respective locations over plural successive scans of tracks of recorded information.

13. In a magnetic tape reproduction machine of the type in which information is stored on the tape in tracks and a magnetic transducing head is scanned along the length of each track to reproduce the stored information, a method for aligning the head with respect to the track, comprising the steps of:

detecting the elevational position of the head relative to a track being scanned at plural locations along the length of the track, and storing a position value for at least some of said locations;

estimating a position value for one of said locations on the basis of the stored position values for at least two locations adjacent said one location in the direction of scan of the tracks; and controlling the elevational position of said head in response to said estimated value and said stored values during the scanning of a track to thereby position said head in accordance with a predicted shape for the track being scanned.

14. The method of claim 13 wherein said estimating step includes generating an estimation value that is an extrapolation of the stored values for at least the two locations immediately adjacent said one location.

15. The method of claim 14 wherein said one location is the first sampled location along the length of a track and said two adjacent locations are the second and third locations along the length of the track.

16. The apparatus of claim 14 wherein said estimation step includes weighting the values of the adjacent locations such that the stored value for the first location immediately adjacent said one location has a greater influence on said extrapolated value than the value for the next location adjacent said one location.

17. A magnetic tape reproduction machine, comprising:

first and second pairs of magnetic transducing heads for reproducing information recorded on a magnetic tape;

means for moving said heads relative to the tape to cause said pairs of heads to alternately come into and out of operative relationship with the tape to scan tracks of information on the tape;

head elevation positioning means for moving said heads in a direction that is transverse to the direction of a scanning movement;

means for detecting the elevational position of the heads which are in operative relationship with the tape, relative to a track being scanned, at plural locations along the length of the track, and for storing a position value for at least some of said locations;

means for estimating a position value for one of said locations on the basis of the stored position values for at least two locations adjacent said one location in the direction of scan of the tracks; and means for controlling said head elevation positioning means in response to said estimated value and said stored values during the scanning of a track to thereby position said heads in accordance with a predicted shape for the track being scanned.

18. The machine of claim 17 wherein said estimating means includes means for generating an estimation signal having a value that is an extrapolation of the stored values for at least the two locations immediately adjacent said one location.

19. The machine of claim 18 wherein said one location is the first sampled location along the length of a track and said two adjacent locations are the second and third locations along the length of the track.

20. The machine of claim 18 further including means for weighting the stored values for said adjacent locations such that the stored value for the first location immediately adjacent said one location has a greater influence on said extrapolated value than the stored value for the next location adjacent said one location.

21. The machine of claim 20 wherein said elevational position detecting means includes means for oscillating said heads in said transverse direction to induce an amplitude envelope in the output signals from said heads, and means for generating a detected dither signal from said envelope, which signal is indicative of the position of the heads relative to a track of recorded information.

22. The machine of claim 21 wherein said elevational position detecting means further includes means for averaging the amplitude envelope in the output signals from the two heads in a pair, and wherein said detected dither signal is generated from said average amplitude envelope.

* * * * *